May 1, 1951 C. N. KIMBERLIN, JR., ET AL 2,551,014
PREPARATION OF CATALYSTS CONTAINING SILICA AND
ALUMINA OR MAGNESIA OR BOTH
Filed May 15, 1946
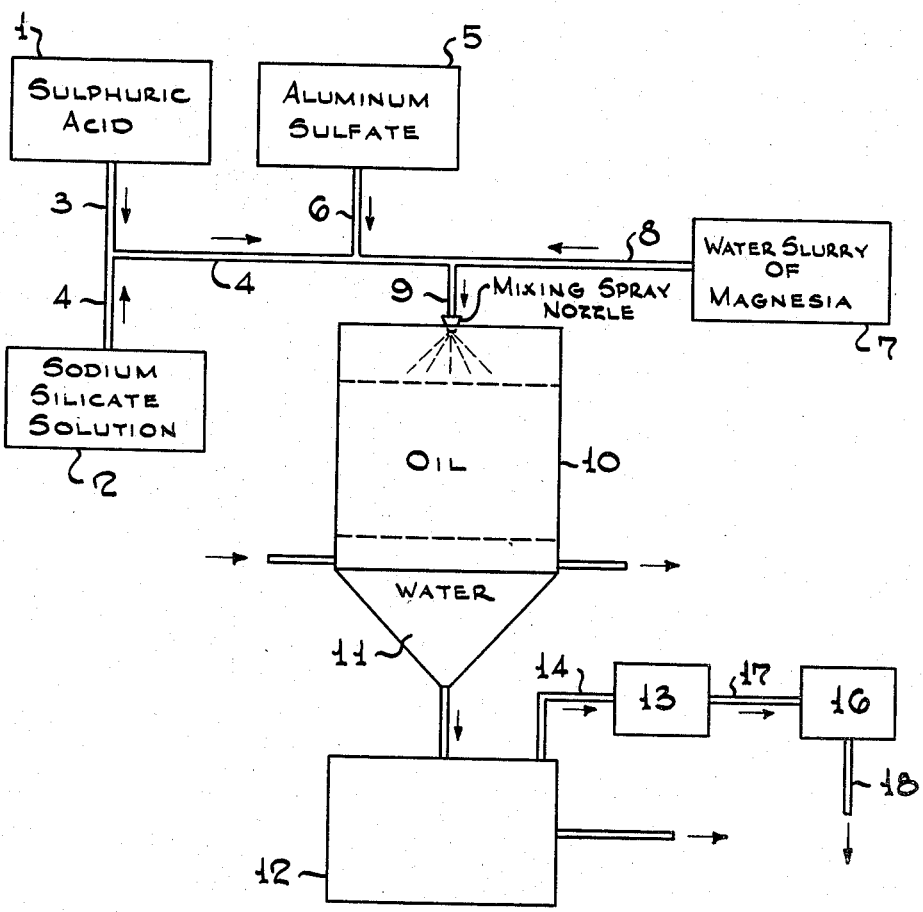
Julius P. Bilisoly
Charles N. Kimberlin, Jr. Inventors
By P. J. Whelan Attorney Patented May 1, 1951

2,551,014

UNITED STATES PATENT OFFICE 2,551,014

PREPARATION OF CATALYSTS CONTAINING SILICA AND ALUMINA OR MAGNESIA OR BOTH

Charles N. Kimberlin, Jr., and Julius P. Bilisoly, Baton Rouge, La., assignors to Standard Oil Development Company, a corporation of Delaware Application May 15, 1946, Serial No. 669,891

21 Claims. (Cl. 252—448)

1

The present invention is concerned with a process for the preparation of improved catalysts. It more specifically relates to the preparation of improved catalysts suitable for use in cracking, reforming, isomerization, polymerization, and alkylation processes. Our invention is particularly concerned with an improved method for preparing granular and spherical catalysts as for example, silica-alumina, silica-magnesia, and silica-alumina-magnesia catalysts. In accordance with our invention magnesia is added to silica hydrosol or to silica hydrosol impregnated with an aluminum salt, followed by washing with water at an elevated temperature.

It is well known in the art to improve the quality of oils particularly petroleum oils by treating the same with catalysts under various operating conditions. For example it is known to treat high boiling petroleum oils with a silica-alumina catalyst, a silica-magnesia catalyst, or a silica-alumina-magnesia catalyst at temperatures in the range from 600° F. to 1100° F. in order to crack the oil and to secure petroleum oil fractions boiling in the motor fuel boiling range.

Heretofore, these catalysts have been prepared by various procedures. One method employed for the preparation of a silica-magnesia catalyst, is to prepare the hydrogel by the mixing of a silicate and sulfuric acid. The hydrogel is washed and mixed and granulated with magnesia and water. The mixture is passed to a colloid mill and homogenized. The catalyst is aged at room temperature for a period of from about 24 to 72 hours. Elevated temperatures have been employed in which cases the aging time period is reduced to from about 5 to 10 hours. The catalyst is dried at a temperature in the range from about 200° F. to 270° F. Another method utilized for the preparation of silica-magnesia or silica-alumina catalyst is to prepare the silica hydrogel by mixing sulfuric acid and a silicate. The silica dydrogel is washed and impregnated either with magnesium sulfate or aluminum sulfate, depending upon whether a silica-magnesia or a silica-alumina catalyst is desired. The impregnated silica hydrogel is treated with an ammonia solution to precipitate either the magnesium or the aluminum. This may require a time period of from about 8 to 10 hours. The catalyst is washed and dried under various temperature conditions.

These methods known in the art for the preparation of silica-alumina, silica-magnesia, and silica-alumina-magnesia catalysts are quite complicated and cumbersome. We have discovered an improved process for the preparation of these catalysts by which they may be readily prepared with a high degree of purity.

We have now discovered that providing our process is employed, a very desirable silica-alumina, silica-magnesia, or silica-alumina-magnesia catalyst is produced. In accordance with our invention, magnesia is added to a silica hydrosol or to a silica hydrosol impregnated with an aluminum salt, followed by water washing preferably at an elevated temperature. After washing substantially free of water soluble salts the hydrogel is dried and activated by heating to a temperature of from 850° F. to 1400° F. By operating in this manner, the time necessary for the hydrosol to set to a hydrogel is materially reduced. Furthermore, our process possesses definite advantages over previous preparations involving operations such as mulling, ammoniation, and the like.

In accordance with our invention our catalysts are prepared by adding magnesia, preferably as a slurry in water, to a simple silica hydrosol or to a silica sol which has been impregnated with an aluminum salt. The action of the magnesia is to neutralize the free acid, thus causing rapid settling of the hydrosol to the hydrogel, and also to decompose the aluminum salt causing precipitation of alumina within and throughout the gel. Excess magnesia used over these requirements remains in the finished product.

The process of our invention may be more readily understood by the following examples illustrating modifications of the same.

EXAMPLE I

A sodium silicate ($Na_2O.3.25SiO_2$) solution having a specific gravity of 1.21 was mixed with a sulfuric acid solution having a specific gravity of 1.19. Approximately 806 parts by weight of the sodium silicate solution was mixed with 396 parts by weight of the sulfuric acid solution.

The resulting silica hydrosol was impregnated with aluminum by the addition of 59 parts by weight of aluminum sulfate solution having a specific gravity of 1.31. A water slurry of magnesia was prepared by the addition of 105 parts by weight of finely divided calcined magnesia to 200 parts by weight of water. The aqueous slurry of magnesia was mixed with the aluminum impregnated silica hydrosol.

The mixture was rapidly dispersed in ten times its volume of a mineral oil and permitted to set to the hydrogel in the form of microspheres.

The hydrogel was transferred to water, washed with distilled water at 150° F. until it was free of the sulfate ion. The hydrogel was dried in a steam oven and activated by heating at 1250° F.

The catalyst prepared in accordance with this procedure had the following composition:

| | Percent |
|---|---|
| Alumina | 2 |
| Magnesia | 38 |
| Silica | 60 |

A petroleum oil boiling in the gas oil boiling range was contacted with this catalyst under cracking conditions in two operations. In the second operation, the catalyst was steamed for 24 hours at 1050° F. and at 60 lbs./sq. in. pressure before being utilized in the cracking operation. The cracking operation was conducted at a temperature of 850° F. at atmospheric pressure, and two hour cycles. The feed rate was 0.6 volume of oil per volume of catalyst per hour. The results of these operations are summarized as follows:

| | Operation I | Operation II |
|---|---|---|
| D+L [1] | 54 | 44 |

[1] Percentage of hydrocarbons in the liquid product boiling below 400° F.

EXAMPLE II

A catalyst was prepared in exactly the same manner as described in Example I except that the washing was conducted at room temperature of about 80° F. instead of at a temperature of about 150° F. When this catalyst was employed to crack a gas oil similar to that employed with respect to Example I, a yield of 35.5% D+L was secured as compared to 54% D+L. It is obvious that it is very desirable to wash the catalyst prepared in accordance with our process at elevated temperatures.

EXAMPLE III

A sodium silicate solution ($Na_2O.3.25SiO_2$) having a specific gravity of 1.21 was mixed by stirring with a sulfuric acid solution having a specific gravity of 1.19. Approximately 806 parts of sodium silicate by weight was used with 396 parts by weight of the sulfuric acid solution. A magnesia slurry comprising 100 parts of magnesia and 200 parts of water by weight was added to the silica sol. The hydrosol thus formed set rapidly to a gel. The hydrogel was washed with distilled water until free of sulfate ions. It was dried in a steam oven and activated by heating at 1250° F. The catalyst had the following composition:

| | Per cent |
|---|---|
| Magnesia | 38 |
| Silica | 62 |

When this catalyst was employed for the cracking of petroleum oils, high yields of hydrocarbons boiling below 400° F. were secured.

EXAMPLE IV

A sodium silicate solution having a specific gravity of 1.21 was mixed by stirring with a sulfuric acid solution having a specific gravity of 1.19. Approximately 605 parts by weight of the sodium silicate solution was used in conjunction with 298 parts by weight of the sulfuric acid solution. An aluminum sulfate solution having specific gravity of 1.31 was then added. About 328 parts by weight of aluminum sulfate was employed. About 40 parts of magnesia and 80 parts of water was added. The hydrosol set rapidly to a hydrogel having a pH value of 4.2. The hydrogel was washed with distilled water, dried in a steam oven and activated by heating at a temperature of 850° F. The catalyst had the following composition:

| | Per cent |
|---|---|
| Alumina | 20 |
| Silica | 80 |

The process of our invention may be readily employed either for the manufacture of granules or microspheres. A procedure for the manufacture of microspheres is shown by the drawing illustrating a preferred modification.

Sulfuric acid solution is maintained in reservoir 1 while sodium silicate is maintained in reservoir 2. The sulfuric acid is withdrawn from reservoir 1 by means of line 3 and mixed with the sodium silicate which is withdrawn from reservoir 2 by means of line 4.

Aluminum sulfate is maintained in reservoir 5 and is introduced into the sodium silicate solution or into the silica hydrosol in line 4 by means of line 6.

A water slurry of magnesia is maintained in reservoir 7. This slurry is withdrawn from reservoir 7 by means of line 8 and combined with the silica solution through mixing spray nozzle means 9. The sol is sprayed into the upper level of an oil bath 10. The catalyst falls downwardly through oil bath 10 and flows into a water bath 11. The catalyst is removed from the bottom of the bath into zone 12 wherein it is washed with water preferably at 150° F. The catalyst is passed to zone 13 by means of line 14 wherein it is dried. The catalyst is introduced into zone 16 by means of line 17 wherein it is activated. The finished catalyst is withdrawn from activation zone 16 by means of line 18.

The process of our invention may be widely varied. Our process essentially comprises in its broadest scope the preparation of a silica hydrosol and the preparation of an aluminum salt impregnated silica hydrosol and the neutralization of the silica hydrosol with a water slurry of magnesia. If the silica hydrosol does not contain an aluminum salt, excess magnesia over and above that required to neutralize the acidic sol is employed. This will result in a silica magnesia catalyst with the magnesia distributed uniformly throughout the gel.

If the silica hydrosol is impregnated with an aluminum salt and providing it is desired to secure a silica alumina catalyst, then only sufficient magnesia slurry is added to neutralize the acidic sol and to decompose the aluminum salt. In this case the gel contains the alumina distributed uniformly throughout the gel. However, if a silica-alumina-magnesia catalyst is desired in accordance with our process, an excess of magnesia is added to the impregnated silica sol.

The relative composition of the ingredients used in accordance with our process may be varied considerably. In general it is preferred that the composition of the constituents be controlled so that a final catalyst comprising about 25 to 33% of magnesia will be secured. If the catalyst comprises alumina it is desired that the alumina concentration be in the range from about 0.5 to 5%.

If the catalyst consists of only silica and alumina, it is preferred that the concentration of the alumina be in the range from about 10 to 15%.

The advantages of catalysts of this character can be seen by reference to the following table wherein a number of catalysts in various concentrations were prepared and utilized in various operations for the cracking of petroleum oils boiling in the gas oil boiling range. Types A, B, C and D magnesia oxides were employed in the respective operations. The cracking operations were conducted at a temperature of 850° F. at atmospheric pressure, and two hour cycles. The feed rate was 0.6 volume of oil per volume of catalyst per hour.

TABLE

*Per cent D+L (percentage of hydrocarbons in the liquid product boiling below 400° F.)*

| Per Cent MgO | Type A | | | Type B | | | Type C | | | Type D | |
|---|---|---|---|---|---|---|---|---|---|---|---|
| | 1250° F.[1] | 1400° F.[1] | Steamed [2] | 1250° F.[1] | 1400° F.[1] | Steamed [2] | 1250° F.[1] | 1400° F.[1] | Steamed [2] | 1250° F.[1] | Steamed [2] |
| 0% Al₂O₃ | | | | | | | | | | | |
| 38 | 57 | 11 | 28 | 57 | 44 | 22 | 27 | 2 | 4 | -- | -- |
| 33 | 56 | 42 | 38 | 65 | -- | 42 | -- | -- | -- | -- | -- |
| 28 | 52 | 46 | 37 | 62 | -- | 44 | -- | -- | -- | 56 | 38 |
| 23 | 44 | 41 | 37 | 52 | -- | 40 | -- | -- | -- | -- | -- |
| 18 | 40 | 37 | 31 | 44 | -- | 31 | -- | -- | -- | -- | -- |
| 13 | 34 | 34 | 26 | 35 | -- | -- | -- | -- | -- | -- | -- |
| 0.5% Al₂O₃ | | | | | | | | | | | |
| 38 | 58 | 40 | 42 | 56 | 42 | 34 | 54 | 15 | 36 | -- | -- |
| 33 | 57 | 57 | 45 | 62 | 50 | 43 | -- | -- | -- | -- | -- |
| 28 | 54 | 51 | 44 | 60 | 43 | 45 | -- | -- | -- | -- | -- |
| 2% Al₂O₃ | | | | | | | | | | | |
| 38 | 59 | 42 | 28 | 61 | 16 | 20 | 56 | 50 | 41 | -- | -- |
| 33 | -- | -- | -- | -- | -- | -- | 64 | 52 | 52 | -- | -- |
| 28 | 66 | 48 | 45 | -- | -- | -- | 60 | 56 | 46 | -- | -- |
| 23 | -- | -- | -- | 54 | 51 | 43 | 55 | 51 | 42 | -- | -- |
| 18 | -- | -- | -- | 50 | 49 | 40 | 49 | 46 | 39 | -- | -- |
| 13 | -- | -- | -- | 42 | 46 | 35 | 42 | 41 | 30 | -- | -- |

[1] 3 hrs. drying time at the respective temperatures.
[2] 24 hrs., 1050° F., 60 p. s. i. g.

The amount of water used in preparation of the magnesia slurry should be sufficient to wet the magnesia. In general, it is preferred to use at least two parts of water by weight per part of magnesia by weight.

The catalyst is preferably washed at elevated temperatures in the range of about 125° F. to 200° F. Very desirable results are secured when washing at temperatures of about 150° F. When finely divided, highly calcined magnesia is used with a silica sol containing approximately 140 grams of silica oxide and 33 grams of sulfuric acid per liter the time of set, at approximately 80° F. initial temperature, is about 2 minutes. When finely divided hydrated magnesia is used, which is less highly calcined the time of set is shortened, being practically instantaneous. Due to the short time of set, a preferred method of mixing the hydrosols and the magnesia slurry is carried out by means of a two-fluid mixing spray nozzle. The process is particularly adaptable to the formation of catalyst in granular form or in spherical form by spraying the mixture into a column of oil. The grade and type of magnesia employed in the preparation of the aqueous slurry may vary widely. The magnesia may be calcined at elevated temperatures up to 2000° F. Also hydrated magnesia or magnesium carbonate may be utilized. The magnesia should be finely divided and not coarser than 100 mesh. It is preferable that it be 200 mesh or finer. An especially desirable grade is about 350 mesh.

The aluminum salt may comprise any salt which is decomposable by magnesia to the hydrous aluminum oxide, as for example, the sulfate, the chloride or the nitrate. We, however, prefer to use aluminum sulfate.

The process of our invention is not to be limited by any theory as to mode of operation, but only in and by the following claims in which it is desired to claim all novelty.

What we claim is:

1. Improved process for the preparation of a catalyst comprising silica which comprises preparing an acidic silica hydrosol, adding thereto an aqueous slurry of magnesia in excess over that required to neutralize the acidic silica hydrosol, converting the neutralized hydrosol to a hydrogel, separating, washing and drying the said hydrogel and activating it by heating to a temperature in the range of 850° to 1400° F.

2. Improved process for the preparation of a catalyst comprising silica which comprises preparing an acidic silica hydrosol, impregnating said silica hydrosol with an aluminum salt, adding thereto an aqueous slurry of magnesia sufficient to neutralize said acidic silica hydrosol and to precipitate alumina, simultaneously converting the resultant mixture to a silica-alumina hydrogel, separating, washing and drying said hydrogel and activating it by heating to a temperature in the range of 850° to 1400° F.

3. Improved process for the preparation of a catalyst comprising silica which comprises preparing an acidic silica hydrosol, impregnating said silica hydrosol with an aluminum salt, adding thereto an aqueous slurry of magnesia in excess over that required to neutralize the acidic silica hydrosol and to precipitate alumina, simultaneously converting the resultant mixture to a silica-alumina-magnesia hydrogel, separating, washing and drying said hydrogel and activating it by heating to a temperature in the range of 850° to 1400° F.

4. Improved process for the preparation of a catalyst comprising silica suitable for cracking hydrocarbons which comprises preparing an acidic silica hydrosol, adding thereto an aqueous slurry of magnesia in excess over that required to neutralize said acidic silica hydrosol, converting the resultant mixture to a silica magnesia hydrogel, washing said hydrogel and recovering said catalyst.

5. Process as defined by claim 4 in which said hydrogel is washed at a temperature in the range from about 125° F. to 200° F.

6. Process as defined by claim 4 in which said hydrogel is washed at a temperature in the range from about 125° F. to 200° F. and then activated at a temperature in the range from 850° F. to 1400° F.

7. Improved process for the preparation of a catalyst comprising silica which comprises preparing an acidic silica hydrosol, impregnating said silica hydrosol with an aluminum salt, adding thereto an aqueous slurry of magnesia sufficient to neutralize the free acid and to precipitate alumina, simultaneously converting the resultant mixture to a silica-alumina hydrogel, washing said hydrogel and drying the same.

8. Process as defined by claim 7 in which said hydrogel is washed at a temperature in the range from about 125° F. to 200° F.

9. Process as defined by claim 7 in which said hydrogel is washed at a temperature in the range from about 125° F. to 200° F. and activated at a temperature in the range from about 850° F. to 1400° F.

10. Improved process for the preparation of a catalyst comprising silica which comprises preparing an acidic silica hydrosol, impregnating said silica hydrosol with an aluminum salt, adding thereto an aqueous slurry of magnesia in excess over that required to neutralize the free acid and to precipitate alumina, simultaneously converting the resultant mixture to a silica-alumina-magnesia hydrogel, washing said hydrogel and drying the same.

11. Process as defined by claim 10 in which said hydrogel is washed at a temperature in the range from about 125° F. to 200° F.

12. Process as defined by claim 10 in which said catalyst is washed at a temperature in the range from about 125° F. to 200° F. and dried at a temperature in the range from about 850° F. to 1400° F.

13. Process for the preparation of a cracking catalyst comprising silica in the form of microspheres which comprises preparing an acidic silica hydrosol, adding thereto an aqueous slurry of magnesia in excess over that required to neutralize the acidic hydrosol, rapidly dispersing the resultant mixture as microspherical particles in a bath of mineral oil, maintaining said particles dispersed in said mineral oil until they have set to silica-magnesia hydrogel microspheres, removing said hydrogel microspheres from said mineral oil, washing, drying and recovering said microspheres.

14. Process as defined by claim 13 in which the hydrogel microspheres removed from the oil bath are washed at a temperature in the range from about 125° F. to 200° F.

15. Process for the preparation of a cracking catalyst comprising silica in the form of microspheres which comprises preparing an acidic silica hydrosol, impregnating the silica hydrosol with an aluminum salt, adding thereto an aqueous slurry of magnesia sufficient to neutralize the free acid and to precipitate alumina, rapidly dispersing the resultant mixture as microspherical particles in a bath of mineral oil, maintaining said particles dispersed in said mineral oil until they have set to silica-alumina hydrogel microspheres, removing said hydrogel microspheres from said mineral oil, washing, drying and recovering said microspheres.

16. Process for the preparation of a cracking catalyst comprising silica in the form of microspheres which comprises preparing an acidic silica hydrosol, impregnating the silica hydrosol with an aluminum salt, adding thereto an aqueous slurry of magnesia in excess over that required to neutralize the acidic hydrosol and to precipitate alumina, rapidly dispersing the resultant mixture as microspherical particles in a bath of mineral oil, maintaining said particles dispersed in said mineral oil until they have set to silica-alumina-magnesia hydrogel microspheres, removing said hydrogel microspheres from said mineral oil, washing, drying and recovering microspheres.

17. Process as defined by claim 16 in which said microspheres are washed with water at a temperature in the range from about 120° F. to 200° F.

18. The process as defined in claim 1 wherein the aqueous slurry of magnesia is added to the hydrosol in a mixing nozzle and the resultant mixture is discharged immediately into a zone for setting to the hydrogel.

19. The process as defined in claim 2 wherein the aqueous slurry of magnesia is added to the hydrosol in a mixing nozzle and the resultant mixture is discharged immediately into a zone for setting to the hydrogel.

20. The process as defined in claim 3 wherein the aqueous slurry of magnesia is added to the hydrosol in a mixing nozzle and the resultant mixture is discharged immediately into a zone for setting to the hydrogel.

21. A process for the preparation of a silica-magnesia catalyst which comprises, preparing an acidic silica hydrosol, adding thereto an aqueous slurry of magnesia, effecting hydrogel formation, washing said hydrogel and drying the same.

CHARLES N. KIMBERLIN, Jr.
JULIUS P. BILISOLY.

REFERENCES CITED

The following references are of record in the file of this patent:

UNITED STATES PATENTS

| Number | Name | Date |
|---|---|---|
| 1,762,228 | Holmes | June 10, 1930 |
| 1,772,055 | Miller et al. | Aug. 5, 1930 |
| 1,900,859 | Connolly et al. | Mar. 7, 1933 |
| 2,215,305 | Voorhies, Jr. | Sept. 17, 1940 |
| 2,340,934 | Connolly | Feb. 8, 1944 |
| 2,356,303 | Connolly | Aug. 22, 1944 |
| 2,384,945 | Marisic | Sept. 18, 1945 |
| 2,387,596 | Marisic | Oct. 23, 1945 |
| 2,389,378 | Marisic | Nov. 20, 1945 |
| 2,390,556 | Ruthruff | Dec. 11, 1945 |
| 2,396,758 | Stratford | Mar. 30, 1946 |
| 2,399,261 | Thomas | Apr. 30, 1946 |
| 2,405,408 | Connolly | Aug. 6, 1946 |
| 2,442,884 | Webb et al. | June 8, 1948 |

FOREIGN PATENTS

| Number | Country | Date |
|---|---|---|
| 392,954 | Great Britain | May 22, 1933 |
| 504,614 | Great Britain | Apr. 24, 1939 |